(12) United States Patent
Sullivan et al.

(10) Patent No.: US 9,241,032 B2
(45) Date of Patent: Jan. 19, 2016

(54) STORAGE PERFORMANCE

(75) Inventors: John Sullivan, Cambridge (GB); David Sinclair Ferguson, Cambridge (GB); Jarrod Lowe, Cambridge (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2475 days.

(21) Appl. No.: 11/598,113

(22) Filed: Nov. 8, 2006

(65) Prior Publication Data

US 2008/0040445 A1 Feb. 14, 2008

(30) Foreign Application Priority Data

Aug. 11, 2006 (GB) .................................. 0615964.4

(51) Int. Cl.
*H04L 29/08* (2006.01)
(52) U.S. Cl.
CPC ............ *H04L 67/104* (2013.01); *H04L 67/108* (2013.01); *H04L 67/28* (2013.01); *H04L 67/2842* (2013.01)
(58) Field of Classification Search
CPC ....................... H04L 29/08396; H04L 67/1076
USPC ........... 709/248, 239, 236, 231, 23, 224, 219, 709/217, 203, 201, 229, 226, 225, 220, 218, 709/216, 215, 206, 228, 227, 238; 726/30, 726/11; 725/91, 87, 56, 115, 111; 370/432, 370/401, 392, 409, 230; 707/6, 202, 100, 707/10
See application file for complete search history.

(56) References Cited

U.S. PATENT DOCUMENTS

| | | | |
|---|---|---|---|
| 5,511,208 | A | 4/1996 | Boyles et al. |
| 5,892,914 | A | 4/1999 | Pitts |

(Continued)

FOREIGN PATENT DOCUMENTS

| | | |
|---|---|---|
| EP | 0 847 020 | 10/1998 |
| EP | 0 315 091 | 5/2003 |

(Continued)

OTHER PUBLICATIONS

Arun Chokkalingam & Firasath Riyaz, BitTorrent Protocol Speficiation v 1, Baylor University, Dec. 12, 2004, http://cs.ecs.bayloredu/~donahoo/classes/5321/projects/bittorrent/BitTorrent%20Protocol%20Specification.doc.*

(Continued)

*Primary Examiner* — David Lazaro
*Assistant Examiner* — Charles Murphy
(74) *Attorney, Agent, or Firm* — Ryan, Mason & Lewis, LLP

(57) ABSTRACT

A network, such as a computer network, is disclosed. The network has a plurality of nodes and includes a first node for storing pieces of a digital object and having a storage. A plurality of connections are present between the first node and the plurality of nodes. The first node has a requester for requesting one or more pieces of the digital object, a transmitter for transferring one or more pieces of the digital object to at least one further node among the plurality of nodes, a receiver for receiving content availability messages from at least some of the plurality of nodes, and a sender for sending a limited content availability message to at least one further node among the plurality of nodes. The limited content availability message indicates a subset but not all of the pieces of the digital object available through the first node.

20 Claims, 4 Drawing Sheets

(56) References Cited

U.S. PATENT DOCUMENTS

| | | | |
|---|---|---|---|
| 6,003,030 | A | 12/1999 | Kenner |
| 6,098,096 | A | 8/2000 | Tsirigotis et al. |
| 6,108,703 | A | 8/2000 | Leighton |
| 6,167,438 | A | 12/2000 | Yates |
| 6,415,280 | B1 | 7/2002 | Farber |
| 6,745,243 | B2 | 6/2004 | Squire |
| 6,823,377 | B1 | 11/2004 | Wu et al. |
| 6,928,441 | B2 | 8/2005 | Haegele |
| 7,010,578 | B1 | 3/2006 | Lewin |
| 7,043,558 | B2 | 5/2006 | Yoshida |
| 7,069,318 | B2 * | 6/2006 | Burbeck et al. ............... 709/224 |
| 2003/0158958 | A1 | 8/2003 | Chiu |
| 2003/0204602 | A1 | 10/2003 | Hudson et al. ............... 709/228 |
| 2004/0143586 | A1 * | 7/2004 | Chung ............................ 707/100 |
| 2004/0148344 | A1 | 7/2004 | Navar et al. |
| 2004/0193714 | A1 | 9/2004 | Bowman et al. |
| 2006/0165014 | A1 | 7/2006 | Ikeda ............................ 370/254 |
| 2006/0168318 | A1 * | 7/2006 | Twiss ............................ 709/238 |

FOREIGN PATENT DOCUMENTS

| | | |
|---|---|---|
| EP | 1 413 119 | 5/2006 |
| GB | 2412279 A | 9/2005 |
| WO | WO 99/05584 | 2/1999 |
| WO | WO 02/42900 A2 | 5/2002 |
| WO | WO 02/058360 A3 | 7/2002 |
| WO | WO 02/089000 A1 | 11/2002 |
| WO | WO 03/015377 A1 | 2/2003 |
| WO | WO 2005/084132 A2 | 9/2005 |

OTHER PUBLICATIONS

Daniel Stutzbach, Swarming Scalable Content Delivery for the Masses, University of Oregon Computer and Information Scient Technical Report, Jan. 2004, 1-8.*

Arun Chokkalingam & Firasath Riyaz, BitTorrent Protocol Speficiation v 1, Baylor University, Dec. 12, 2004, http://cs.ecs.bay~r.edu/-d~nah~/c~asses/5321/pr~jects/bitt~rrent/BitT~rrent%2~Pr~t~c~%20Specificati~n.d~c.*

Chandhok, Nikhil—Web Distribution Systems: Caching and Replication, Nov. 18, 1999, pp. 1-13, http://www.cse.wustl.edu/%7Ejain/cis788-99/ftp/web_caching/index.html.

Konstanty, Piotr—Web Cache Charging Policies, Nicholas Copernicus University, NLANR Web Caching Workshop, Torun, Poland, Coulder, 1997, 3 pages http://workshop97.ircache.net/Papers/Kozinski/kozinski.html.

Malpani, Radhika—Making World Wide Web Caching Servers Cooperate, University of California at Berkeley, 10 pages, 1995 http://bmrc.berkeley.edu/research/publications/195/138/paper-59.html.

Chu, H., "Relay Mode," Dec. 16, 2005, http://rakshasa.no/pipermail/libtorren_t-devel/2005-December/000447.html>, pp. 1-2.

Vlavianos, A. et al., "BiToS: Enhancing BitTorrent for Supporting Streaming Applications," Department of Computer Science and Engineering, University of California Riverside, pp. 1-6, http://castor.sics.se/presentations/papers/bitos.pdf.

Legout, A. et al., "Understanding BitTorrent: An Experimental Perspective," INRIA-00000156, Version 3, Nov. 9, 2005, I.N.R.I.A., Sophia Antipolis, France, http://bal.inria.fr/inria-00000145/en, pp. 1-16.

Otto, C., "IO bound," Thursday, Apr. 12, 2007, http://lists.ibiblio.org/pipermail/bittorrent/2007-April/002075.html, p. 1.

International Search Report and the Written Opinion for International Application No. PCT/EP2007/007107, mailed on Nov. 26, 2007.

XP-002460863, Peer to Peer Cache Discovery Protocol (CDP) cachelogic-cdp-specification-02.txt, CacheLogic Ltd., Aug. 25, 2006.

Broadband DSLReports.com, "Bit Torrent Uploads Being Disconnected," http://www.dslreports.com/forum/remark,14997671, Dec. 2005.

* cited by examiner

STORAGE PERFORMANCE

FIELD OF THE INVENTION

The invention relates to a computer network having a plurality of nodes in which the access of digital objects at a node is optimised and a method for optimising the access of the digital objects at a node.

BACKGROUND TO THE INVENTION

Caches for the intermediate storage of data transferred about the Internet are known in the art. The most common type of cache used in the Internet is a proxy cache. The proxy cache operates at the application level, passing some messages unaltered between a client and a server, changing other ones of the messages and sometimes responding to the messages itself rather than relaying the messages. A web proxy cache sits between web servers and one or more clients and watches requests for HTML pages, music or audio files, video files, image files and data files (collectively known as digital objects) pass through. The web proxy cache saves a copy of the HTML pages, images and files for itself. Subsequently if there is another request for the same object, the web proxy cache will use the copy that was saved instead of asking an origin server to resend the request.

There are three main reasons why proxy caches are used:
i) In order to reduce latency—in this case, the request is satisfied from the proxy cache (which is closer to the client) instead of the origin server. It therefore takes less time for the client to get the object and display the object. This makes web sites seem more responsive to the client.
ii) To reduce traffic—Each object is only retrieved once from the server once, the proxy cache reduces the amount of bandwidth used by an Internet Service Provider to the outside world and by the client. This saves money if the client is paying for the traffic and keeps the client's bandwidth requirements lower and more manageable.
iii) To increase delivery speed.

The proxy caches may be provided by an Internet Service Provider at an access point and can continually store digital objects accessed by the ISP customers. For example, CacheLogic, Cambridge, UK, provides solutions which can be used by ISPs and others to reduce their traffic.

These solutions are documented briefly in the document "the Impact of P2P and the CacheLogic P2P Management Solution" (available 1 Aug. 2006 at http://www.cachelogic.com/products/resource/Intro_CacheLogic_P2P_Mgmt_Solution_v3.0. pdf)

Caches generally have both a fast access solid state memory and disk memory. It is known that the access time to the disk memory is substantially slower than the access time to the solid state memory. This is because access to data on the disk memory requires the mechanical movement of a reading head. Alternatively, a cache may have some local memory (solid state and/or disk) but may also have access to remote memory (solid state and/or disk). Accessing remote memory on a remote machine is also more expensive than accessing memory on the immediate machine.

One solution to speed up the access time would be to have solely solid state memory. However this is extremely expensive. Given the large sizes of the caches used in the ISPs the cost is likely to be prohibitive for many ISPs except for very special applications. It would therefore be advantageous to provide a management system to improve the access times.

A peer-to-peer (also termed P2P) computer network is a network that relies primarily on the computing power and bandwidth of the participants in the computer network rather than concentrating computing power and bandwidth in a relatively low number of servers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network.

This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC@find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programmes used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients should use to verify the integrity of the data they receive.

The tracker is a server that keeps track of which seeds (i.e. a node with the complete file or group of files) and peers (i.e. nodes that do not yet have the complete file or group of files) are in a swarm (the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller pieces, typically a quarter of a megabyte (256 KB) in size. Larger file sizes typically have larger pieces. For example, a 4.37 GB file may have a piece size of 4 MB (4096 KB). The pieces are checked as they are received by the BitTorrent client using a hash algorithm to ensure that they are error free.

As further peers enter the swarm, all of the peers begin sharing pieces with one another, instead of downloading directly from the initial seeder. Clients incorporate mechanisms to optimize their download and upload rates. Peers may download pieces in a random order and may prefer to download the pieces that are rarest amongst its peers, to increase the opportunity to exchange data. Exchange of data is only possible if two peers have different subsets of the file. It is known, for example, in the BitTorrent protocol that a peer initially joining the swarm will send to other members of the swarm a content availability message in the form of a BitField message which indicates an initial set of pieces of the digital object which the peer has available for download by other ones of the peers. On receipt of further ones of the pieces, the peer will send further content availability messages in the form of Have messages to the other peers to indicate that the further ones of the pieces are available for download.

The substantial increase in traffic over P2P networks in the past few years has increased the demand for P2P caches and also for alternative P2P management techniques. In particular there is a need to ensure that those pieces of the digital object required are preferably available with short access times.

SUMMARY OF THE INVENTION

It is furthermore an object of the invention to reduce the number of disk accesses to data at nodes in a network.

This invention provides a network having a plurality of nodes. The network has at least a first node for storing pieces of a digital object and has a storage. There are a plurality of connections between the first node and the plurality of nodes. The first node has a requester for requesting one or more pieces of the digital object, a transmitter for transferring one or more pieces of the digital object to at least one further node among the plurality of nodes, a receiver for receiving content availability messages from at least some of the plurality of nodes and a sender for sending at least one limited content availability message to at least one further node among the plurality of nodes. In the invention the at least one limited content availability message indicates a subset but not all of the pieces of the digital object available through the first node.

The content availability messages in effect defers the delivery of full information about those pieces of the digital object which are currently present or available through the storage. The content availability messages preferably indicate those pieces of the digital object preferentially transferable by the transmitter to another node (peer) in the network. Such preferential transfer would be because the piece is, for example, in the fast access memory (i.e. in the solid state memory) or on local disk.

The nodes can be either other peers or caches, such as proxy caches.

Logic can be incorporated into the network to decide which ones of the pieces of the digital object should be preferentially transferred.

The invention can be employed in a proxy cache and also in a peer in a peer-to-peer network.

This invention also provides a method of providing pieces of digital object from a first node to a plurality of nodes in a computer network. The method comprises the following steps:
 a first step of sending to at least one further node among the plurality of nodes at least one limited content availability message, whereby the at least one limited content availability message indicates a subset but not all of the pieces of the digital object available through the first node;
 a second step of receiving a request for pieces of the digital object from at least one of the plurality of nodes;
 a third step of transferring one or more pieces of the digital object to the at least one of the plurality of nodes.

DETAILED DESCRIPTION OF THE INVENTION

Figure 1:
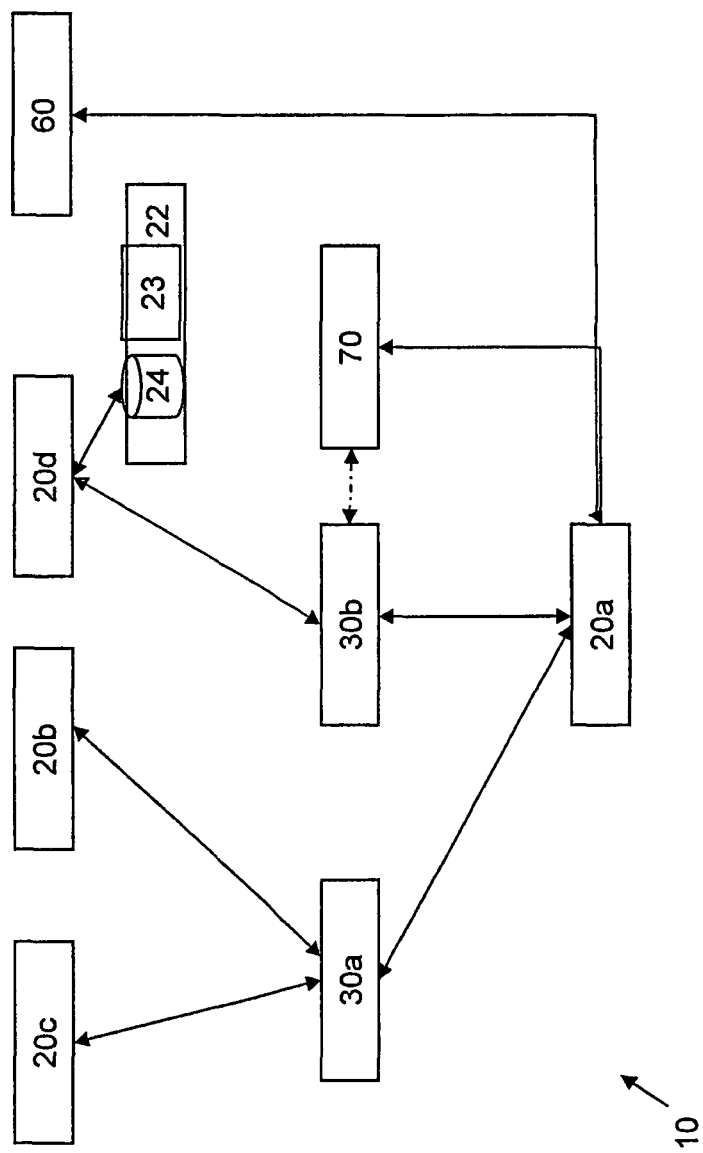
FIG. 1 shows the invention with a proxy cache.

FIG. 1 shows an example of a peer-to-peer network 10 with a plurality of peers 20a, 20b, 20c and 20d—collectively referred to as peers 20—connected to each other. The peers 20 are connected to a memory 22 which includes both a fast storage system (e.g. solid state memory or RAM) 23 and a slow storage system, e.g. a disk 24. In FIG. 1, only one memory 22 is shown. It will, however, be known to the skilled person that each of the peers 20 will probably have the memory 22.

The peer-to-peer network 10 includes in one embodiment of the invention one or more proxy cache, such as, proxy cache 30a and 30b—collectively referred to as proxy cache 30, a central server 60 and a tracker 70. At least one of the peers 20a is attached to at least one proxy cache 30. In the embodiment of the invention shown in FIG. 1 two proxy caches 30a, 30b are shown. However, this is not limiting of the invention and the invention could use none, one or more than one proxy cache 30. The invention is described with respect to one protocol—the BitTorrent protocol—that has been described in the introduction. The invention is, however, not limited to the use of the BitTorrent protocol. Other protocols include similar messages to the BitField and Have messages, but name them differently. Other protocols may have messages requesting for offers of pieces available.

Figure 2:
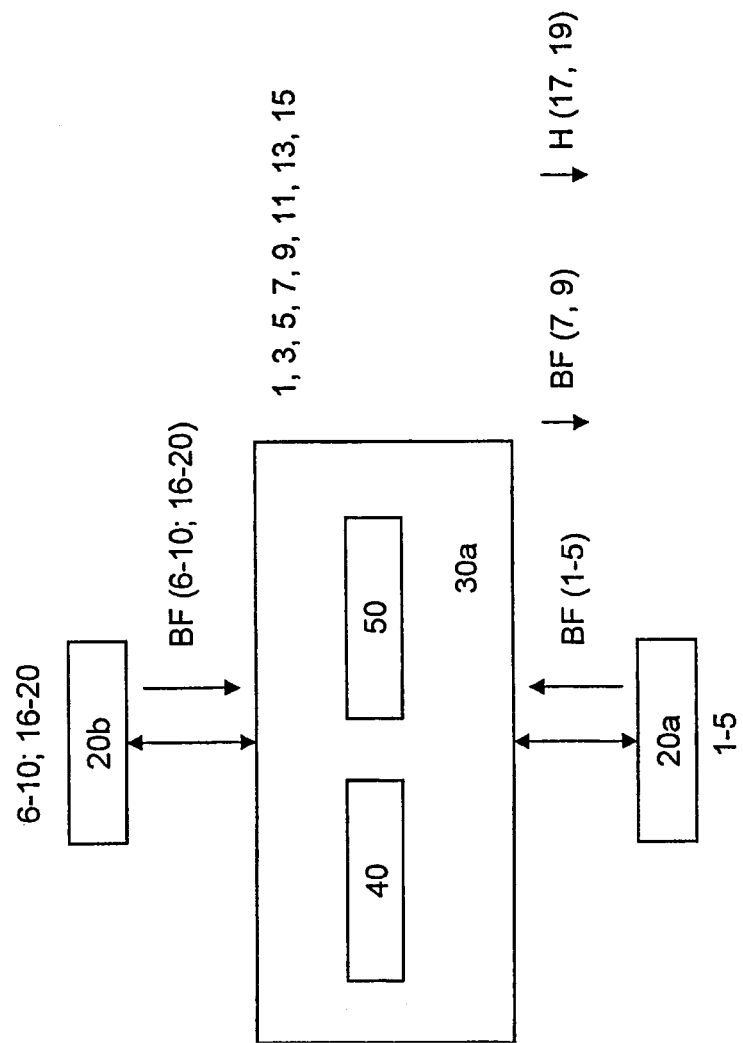
FIG. 2 shows the access of pieces of the digital object through the proxy cache in a P2P network.

The proxy caches 30 have both solid state memory 40 and a disk 50 as is shown in FIG. 2. It is known in the art that the access times for data stored on the disk 50 are substantially longer than the access times for data stored in the solid state memory 40. It is also possible that the proxy caches 30 have both local (immediate) memory and access to remote memory.

Accessing data from the local memory is substantially faster than accessing data from the remote memory.

Suppose now that the peer 20a requests a digital object from the peer-to-peer network 10. The peer 20a does this by downloading a file from a central server 60 containing meta-information relating to the digital object. The meta-information includes the address of a tracker 70 The tracker 70 provides a list of peers 20 in the swarm. Thereafter the peer 20*a* then issues a request to the other peers 20 in the swarm indicating an interest to download the available pieces of the digital object. A BitField message will initially indicate that the peer 20*a* has no pieces of the digital object to contribute. Other BitField messages are received from all of the peers 20 of the swarm. Each of the peers 20 indicates the pieces of the digital object available with each of the peers 20. Subsequently the peer 20*a* indicates to the peers 20 of the pieces of the digital object that the peer 20*a* wishes to download. After downloading, the peer 20*a* sends a Have message to the members of the swarm which indicate the presence of the downloaded pieces of the digital object available with the peer 20*a*.

Consider now the peer 20*d* connected to the memory 22. The memory 22 has one or more pieces of the digital object stored either in the solid state memory 23 or on the disk 24. In the existing prior art systems, the peer 20*d* would issue a content availability message (BitField message or Have message) to inform the peer 20*a* which pieces are available from the peer 20*d*. Some of the pieces are quickly accessible from the fast access memory in the form of the solid state memory 23. Other ones of the pieces are accessible more slowly because they are stored on the disk 24. In the invention, therefore a limited content availability message is sent which does not indicate all of the available pieces of the digital object, but a limited subset of the pieces. This limited subset of the pieces will be the pieces of the digital object which the peer 20*d* is prepared to transfer to the peer 20*a*.

The limited subset of pieces could be those pieces of the digital object currently stored in the fast access portion of the memory 22. The limited subset of pieces might also be the most requested pieces or those pieces which the peer 20*d* will soon retrieve from the disk 22 (or has recently retrieved from the disk 22 because the piece was offered to another one of the peers 20). The members of the limited subset of pieces could change with time as the pieces are stored to and retrieved from the disk 22. Finally, it should be noted that it is possible that the limited subset of pieces could also include all of the pieces of the digital object currently stored in the memory 22 of the peer 20*d* and indeed ultimately might be all of the pieces that make up the digital object. It is preferable that the peer 20*d* continually offers to other peers 20 the pieces of the digital object which the requesting peer 20*a* does not currently have (as will be indicated by the content availability messages received from the requesting peer 20*a*. This ensures that the requesting peer 20*a* will offer the peer 20*d* pieces of the digital object. It should also be noted that, if the peer 20*d* has offered the piece to the requesting peer 20*a*, then it is advantageous to offer the piece to other ones of the peers 20 at this stage, since this would be the most efficient way of supplying the piece to the other members of the swarm.

The proxy cache 30 (when present) can be utilised to improve the transfer of the pieces of the digital object. All of the messages in this embodiment of the invention are communicated through the proxy cache 30. In the example illustrated in FIG. 1, two proxy caches 30*a* and 30*b* are shown and the messages are transferred through both of these. The received pieces of the digital object are transferred back to the requesting peer 20*a* through the proxy cache 30. In this embodiment, the pieces of the digital object are also stored in the proxy cache 30. The stored pieces of the digital object are then transferred to the requesting peer 20*a*.

The proxy cache 30 stores the pieces of the digital object initially in a solid state memory 40 (fast-access memory) and subsequently stores the pieces of the digital object to the disk 50. The proxy cache 30 may comprise more than one cache 30*a*, 30*b* as is indicated in FIG. 1. In an embodiment of the invention, different pieces of the digital object are stored on different ones of the proxy caches 30, such as the proxy caches 30*a* and 30*b*. So, for example, all "even-numbered" pieces of the digital object may be stored on the proxy cache 30*a* and all "odd-numbered" pieces of the digital object may be stored on the proxy cache 30*b*. This method has the advantage that the storage on the proxy cache 30 is balanced between the two proxy caches 30*a* and 30*b*. If three proxy caches 30 are included then every third piece may be stored on the same one of the proxy caches 30. Alternatively, two of the three caches may store copies of the same pieces. In this embodiment, a first one of the proxy caches 30 would have pieces 0 and 1, a second one of the proxy caches may store pieces 1 and 2 and a third one of the proxy caches 30 may store pieces 2 and 0.

Suppose now that the proxy cache 30 has some stored pieces of the digital object in the solid-state memory 40 and some pieces of the digital object on the disk 50. On account of the different access times, as discussed above, it would be most efficient to supply to the other peers 20 in the network 10 the pieces of the digital object that are in the solid-state memory 40 rather than the pieces of the digital object that are stored on the disk 50. Similarly, it is would be more efficient to supply the peer 20*a* with the pieces stored on the disk 50 rather than fetching other ones of the pieces from peers 20*b-d*. In particular, if the peers 20*b-d* are outside of the Internet Service Provider, then it will be more efficient to supply the pieces from the disk 50 than from the peers 20*b-d*. In the prior art the BitField messages sent by the proxy cache 30 (acting as a peer) would include all of the possible pieces stored in the proxy cache 30 and/or the pieces available on peers 20*b-d*. The proxy cache 30 may also in the prior art send Have messages indicating newly acquired pieces to the other peers 20 in the swarm.

This arrangement of the caches is particularly suitable for clusters of caches, for example at the edge of an ISP's network.

Figure 4:
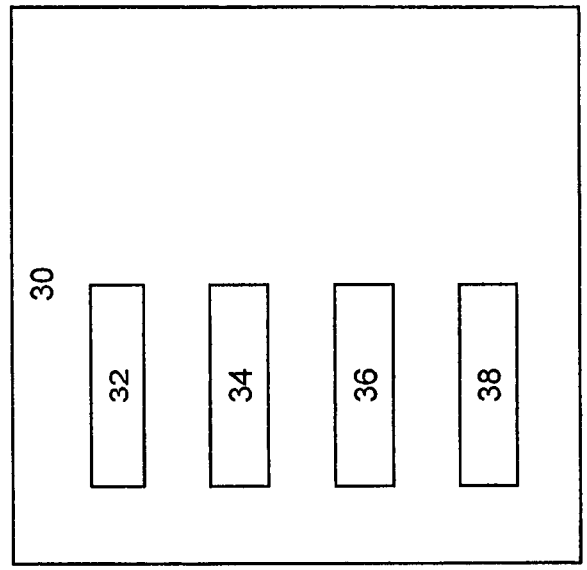
FIG. 4 is a block diagram illustrating an example of the modules of a proxy
Note: the changes below are intended to reduce the differentiation between embodiments this allowing "a cross embodiment" claiming.

The logic of the proxy cache 30 is illustrated in FIG. 4. It should be understood that the blocks shown in FIG. 4 represent an example of the logic implemented. It is not intended that the separate components are provided. It should be understood that these blocks may be implemented in an appropriate manner including virtual implementation. The proxy cache 30 includes a sender 32 for sending content availability messages to the other peers 20. The content availability messages include messages such as the BitField message and the Have message. The content availability messages will be modified in a particular manner. The proxy cache 30 also includes a receiver 34 for receiving content availability messages from the other peers 20. The proxy cache 30 further includes a requester 36 for requesting one or more pieces of the digital object from at least one of the peers 20 and a transmitter 38 for transferring one or more pieces of the digital object to at least one of the peers 20.

In the modification described herein the proxy cache 30 informs the other peers 20 of the swarm that the proxy cache 30 only has a limited number of pieces of the digital object (whereas, in fact, the proxy cache 30 has more pieces of the digital object). This information is communicated in the form of a modified BitField message or Have message to the other peers 20 (i.e. a modified content availability message from sender 32). Therefore, the other peers 20 will only request from the proxy cache 30 the pieces of the digital object which the other peers 20 consider the proxy cache 30 to have. The proxy cache 30 may ensure that the pieces of the digital object are in the solid state memory 40 and thus fast accessible. This reduces the number of disk accesses which not only improves the access speed but also reduces the risk of failure of the disk 50.

The proxy cache 30 can be proactive by examining the BitField and Have messages received from the other peers 20 to determine the pieces of the digital object most likely to be requested. If it is identified that a particular piece is likely to be requested and is present on the disk 50, the proxy cache 30 may retrieve the likely request piece and load the likely requested piece into the solid state memory 40 in order to allow fast access in the future. The proxy cache 30 can thereafter issue the Have message or the BitField message to the other peers 20 informing them of the availability of the piece.

The proxy cache 30 can also use the received BitField and Have messages to determine the pieces most likely to be requested and may actively seek the most likely to be requested pieces from other peers 20. On retrieval, the requested pieces are held in the solid state memory 40 (as well as being stored to disk 50) to allow fast retrieval by other peers 20—in particular the peers 20 connected to the proxy cache 30. So, for example, the proxy cache 30 may know that some of the pieces are obtainable from one of the peers 20 and these pieces are requested. The proxy cache 30 can issue a Have message to tell the other peers 20 that the requested piece is, in fact, present in the proxy cache 30 when the piece has yet to be loaded. The proxy cache 30 is likely to receive requests from the other peers 20 for the requested piece which the proxy cache 30 can fulfill once the proxy cache downloads the requested piece.

An example will serve to illustrate this in detail. FIG. 2 illustrates the proxy cache 30a with the disk 50 and the solid state memory 40 storing only odd-numbered pieces, such as 1,3,5,7,9,11,13 and 15. The peer 20a already has pieces 1-5 and still requires pieces 6-20. The peer 20b has pieces 6-10 and 16-20. The proxy cache 30a has pieces 7 and 9 in the solid state memory 40. It therefore sends a BitField (BF) and/or a Have (H) message to the peer 20a informing the peer 20a that the proxy cache 30a only has pieces 7 and 9. The proxy cache 30a does not at this stage inform the peer 20a that the proxy cache 30a has pieces 11, 13 and 15 since these are stored on the disk 50 and as a result are not fast accessible.

The peer 20b sends a BitField message indicating that the peer 20b has pieces 6-10 and 16-20. The proxy cache 30 a does not need pieces 6-10 and, therefore, ignores this part of the BitField message. On the other hand the proxy cache 30 a requires the pieces 17 and 19 (it will be recalled that the proxy cache 30 a, in this example, does not store even-numbered pieces).

Thus, the proxy cache 30a sends a Require message to the peer 20b to retrieve the pieces 17 and 19. On retrieval the pieces 17 and 19 are stored in the proxy cache 30a and the proxy cache 30a sends a Have message indicating that the proxy cache 30a has pieces 17 and available. The pieces 17 and 19 should be kept in solid state memory 40 to allow fast access as it is highly likely that the peers 20, not having 17 and 19, will react to the Have message.

Figure 3:
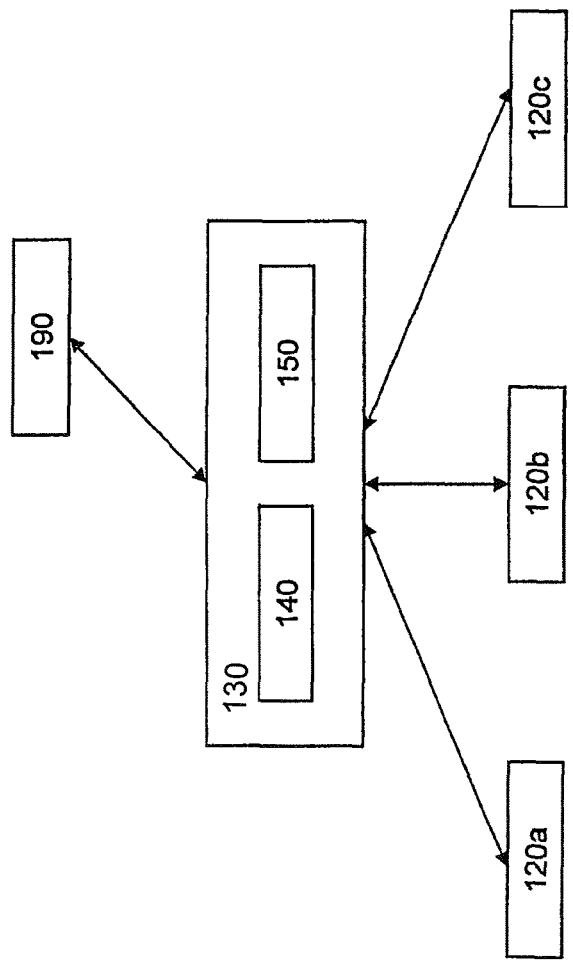
FIG. 3 shows the invention in which multiple peers are connected to a cache.

The invention is further illustrated in FIG. 3 in which one or more peers 120a-120c (collectively referred to as cache 120) are connected to a cache 130. In this case the cache 130 does not function as a proxy cache but rather downloads the pieces of the digital object from another server 190 and uploads the pieces of the digital object from the peers 120. The function of the cache 130 is described in co-pending patent application.

Further, the cache 130 also includes a disk 150 and a solid-state memory 140 for faster access. Similar to the embodiment described above, pieces of the digital object requested by the peers 120 may be stored in the solid-state memory 140 and/or the disk 150. The cache 130 also has a similar module as illustrated in FIG. 4. The cache 130 issues BitField or Have messages indicating the pieces of the digital object which the cache 130 has stored. The cache 130 will not inform the peers 120 about all of the available pieces of the digital object and preferentially inform about the pieces of the digital object which are available in the fast access solid state memory 140 rather than the pieces of the digital object which are stored on the disk 150. The peers 120, in their requests, will request from the cache 130 only the pieces of the digital object which the cache 130 has indicated to be available (even if the cache 130 has only issued a limited subset of the available pieces). The requests from the peers 120 will be served from the solid-state memory 140.

The cache 130 can analyse the BitFields or the Have messages sent from the peers 120 to analyse the pieces of the digital object which are most requested. If the most requested pieces of the digital object are on the disk 150, but not in the solid-state memory 140, the cache 130 can read the pieces of the digital object into the solid-state memory 140 and can then issue a Have message to indicate that the cache 130 now has the most requested pieces of the digital object. Subsequently, the cache 130 will serve any requests for access to the most requested pieces of the digital object.

Similarly if the cache 130 has recently acquired a piece of the digital object which the cache 130 previously did not have, the cache 130 will retain the recently acquired piece of the digital object in the solid-state memory 140 and issue a Have message to allow the peers 120 to download the piece from the cache 130.

It should be noted that the cache can also retrieve pieces of the digital object from both local memory and more distant memory. In this sense, local memory is that memory which is in the same location as the cache. Remote memory is memory that is at a more distant location and thus requires longer to access.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description is that of the preferred embodiments of the invention and that various changes and modifications may be made thereto without departing from the sprit and scope of the invention.

The invention claimed is:

1. An apparatus comprising:
   at least a first node for storing pieces of a digital object and having a storage;
   wherein the first node comprises:
   a requester for requesting one or more pieces of the digital object;
   a transmitter for transferring one or more pieces of the digital object to at least one further node among a plurality of nodes;
   a receiver for receiving content availability messages from at least some of the plurality of nodes; and
   a sender for sending at least one limited content availability message to at least one further node among the plurality of nodes, whereby the at least one limited content availability message indicates a subset but not all of the pieces of the digital object available through the first node, and whereby at least a portion of the subset of the pieces of the digital object that are indicated in the limited content availability message are selected so as to decrease time required for the first node to access the at least a portion of the subset of the pieces of the digital object.

2. The apparatus of claim 1, wherein the subset comprises the pieces of the digital object preferentially transferable by the transmitter to at least one further node.

3. The apparatus of claim 1, wherein the storage has a fast access storage and a disk storage and the subset comprises at least some of the pieces of the digital object stored in the fast access storage.

4. The apparatus of claim 1, wherein the subset comprises at least some of the pieces of the digital object recently accessed by the disk storage.

5. The apparatus of claim 1, wherein the subset comprises at least some of the pieces of the digital object accessible in a local storage.

6. The apparatus of claim 1, wherein the subset comprises at least some of the requested pieces of the digital object identified by the receiver from the received content availability messages from the plurality of nodes.

7. The apparatus of claim 1, wherein the subset comprises at least some of the pieces available on further storages.

8. The apparatus of claim 1, wherein the subset comprises at least some of the pieces of the digital object sent in limited content availability messages to at least one further node among the plurality of nodes.

9. The apparatus of claim 1, wherein the subset is selected such that the number of pieces communicated to a member of the plurality of nodes through the limited content availability message is based on previously received content availability messages from the member of the plurality of nodes.

10. The apparatus of claim 9, wherein the first node is a peer or seed in a peer-to-peer network.

11. The apparatus of claim 1, wherein the first node is a proxy cache.

12. The apparatus of claim 1, wherein the first node comprises a plurality of proxy caches.

13. The apparatus of claim 12, wherein at least two of the plurality of proxy caches stores a different subset of the pieces of the digital object.

14. A method comprising:
sending, from a first node to at least one further node among a plurality of nodes in a network, at least one limited content availability message, whereby the at least one limited content availability message indicates a subset but not all of the pieces of the digital object available through the first node, and whereby at least a portion of the subset of the pieces of the digital object that are indicated in the limited content availability message are selected so as to decrease time required for the first node to access the at least a portion of the subset of the pieces of the digital object;
receiving, at the first node, a request for pieces of the digital object from at least one of the plurality of nodes; and
transferring one or more pieces of the digital object from the first node to the at least one of the plurality of nodes.

15. The method of claim 14, wherein sending to at least one further node among the plurality of nodes at least one limited content availability message comprises including in the at least one limited content availability message at least some of the pieces of the digital object that are present in a fast access storage.

16. The method of claim 14, wherein sending to at least one further nodes among the plurality of nodes at least one limited content availability message comprises including in the at least one limited content availability message at least some of the pieces of the digital object that are present in a local storage.

17. The method of claim 14, further comprising accessing at least some of the pieces of the digital object stored in a slow access storage and transferring the accessed pieces of the digital object to the fast access storage.

18. The method of claim 14, further comprising analysing a plurality of the requests for pieces of the digital object from the plurality of nodes, thereby identifying most likely requested pieces of the digital object, and ensuring that at least some of the most likely requested pieces of the digital object are in the fast access storage.

19. The method of claim 14 further comprising requesting one or more pieces of the digital object and transferring the requested one or more pieces of the digital object and storing the requested one or more pieces of the digital object into a storage device.

20. The method of claim 14, wherein the first node comprises at least two memories and different pieces of the digital object are stored in different ones of the at least two memories.

* * * * *